United States Patent
Holz et al.

(10) Patent No.: US 10,223,535 B2
(45) Date of Patent: Mar. 5, 2019

(54) RANKING SECURITY SCANS BASED ON VULNERABILITY INFORMATION FROM THIRD PARTY RESOURCES

(71) Applicant: International Business Machines Corporation, Armonk, NY (US)

(72) Inventors: Elizabeth A. Holz, Austin, TX (US); Hyun Kyu Seo, Austin, TX (US); Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 15/378,173

(22) Filed: Dec. 14, 2016

(65) Prior Publication Data

US 2018/0165457 A1    Jun. 14, 2018

(51) Int. Cl.
  *G06F 21/57*    (2013.01)
  *H04L 29/06*    (2006.01)

(52) U.S. Cl.
  CPC ........ G06F 21/577 (2013.01); H04L 63/1433 (2013.01); *G06F 2221/034* (2013.01); *G06F 2221/2115* (2013.01)

(58) Field of Classification Search
  CPC ........... G06F 21/577; G06F 2221/2115; G06F 2221/034; H04L 63/1433
  See application file for complete search history.

(56) References Cited

U.S. PATENT DOCUMENTS

| | | | |
|---|---|---|---|
| 7,516,476 B1 | 4/2009 | Kraemer et al. | |
| 7,530,106 B1 | 5/2009 | Zaitsev et al. | |
| 8,671,087 B2 | 3/2014 | Wills et al. | |
| 9,158,558 B1 | 10/2015 | Hernacki et al. | |
| 2003/0212909 A1* | 11/2003 | Chandrashekhar | G06F 21/577 726/25 |
| 2006/0137009 A1* | 6/2006 | Chesla | G06F 21/552 726/22 |
| 2007/0143851 A1* | 6/2007 | Nicodemus | G06F 11/3495 726/25 |
| 2009/0070880 A1* | 3/2009 | Harris | G06F 21/552 726/25 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Darren B Schwartz
(74) *Attorney, Agent, or Firm* — Law Office of Jim Boice

(57) ABSTRACT

A computer-implemented method improves a computer system's security. A description of real-time trends, for multiple computer security issues from a third party resource is associated with multiple security routines for a computer system. The multiple security routines are sorted according to the real-time trends, such that the sorting establishes an order of priority for running each of the multiple security routines based on the real-time trends. A percentage of sorted security routines to execute on the computer system is executed in their order of priority to identify one or more computer security issues for the computer system. One or more processors then execute a resolution program to resolve the one or more computer security issues that are identified for the computer system.

20 Claims, 6 Drawing Sheets

(56) References Cited

U.S. PATENT DOCUMENTS

2012/0330959 A1    12/2012  Kretz et al.
2018/0041533 A1*   2/2018   Chesla ................ G06F 17/3053

OTHER PUBLICATIONS

Muturi et al., "A Reference Model on Crowdsourcing as a Service". IEEE, 2015 IEEE 4th International Conference on Cloud Networking (Cloudnet).

Chen et al., "Predicting and Fixing Vulnerabilities Before They Occur: A Big Data Approach". ACM, Proceedings of the 2nd International Workshop on Big Data Software Engineering.

Elci, "Generating a Standardized Upper Ontology for Security of Information and Networks." Computational Intelligence Cyber Security and Computational Models. Springer Singapore, 2016. pp. 27-32.

Burguera et al., "Crowdroid: Behavior-Based Malware Detection System for Android." Proceedings of the 1st ACM Workshop on Security and Privacy in Smartphones and Mobile Devices. ACM, 2011.

Imperva, "Imperva Report Demonstrates Importance of Crowd-Sourced Threat Intelligence." Imperva, Inc., 2013. Web. Nov. 14, 2016. <http://investors.imperva.com/PHOENIX.ZHTML?C=247116&P=IROL NEWSARTICLE&ID=1809468>.

Marketwired, "Risk I/O Adds Real-Time Attack Data to Vulnerability Intelligence Platform". Nasdaq, Inc., Jun. 19, 2013. Web Nov. 14, 2016. <http://www.marketwired.com/press-release/risk-i-o-adds-real-time-attack-data-to-vulnerability-intelligence-plafform-1803546.htm>.

* cited by examiner

RANKING SECURITY SCANS BASED ON VULNERABILITY INFORMATION FROM THIRD PARTY RESOURCES

BACKGROUND

The present invention relates to the field of computers, and particularly to computers that are vulnerable to malicious attacks. More particularly, the present invention relates to ranking security scanning routines based on vulnerability information from third party resources.

SUMMARY

In one or more embodiments of the present invention, a computer-implemented method improves a computer system's security. A description of real-time trends, for multiple computer security issues from a third party resource is associated with multiple security routines for a computer system. The multiple security routines are sorted according to the real-time trends, such that the sorting establishes an order of priority for running each of the multiple security routines based on the real-time trends. A percentage of sorted security routines to execute on the computer system is executed in their order of priority to identify one or more computer security issues for the computer system. One or more processors then execute a resolution program to resolve the one or more computer security issues that are identified for the computer system.

The described invention may also be implemented in a computer system and/or as a computer program product.

DETAILED DESCRIPTION

Figure 1:
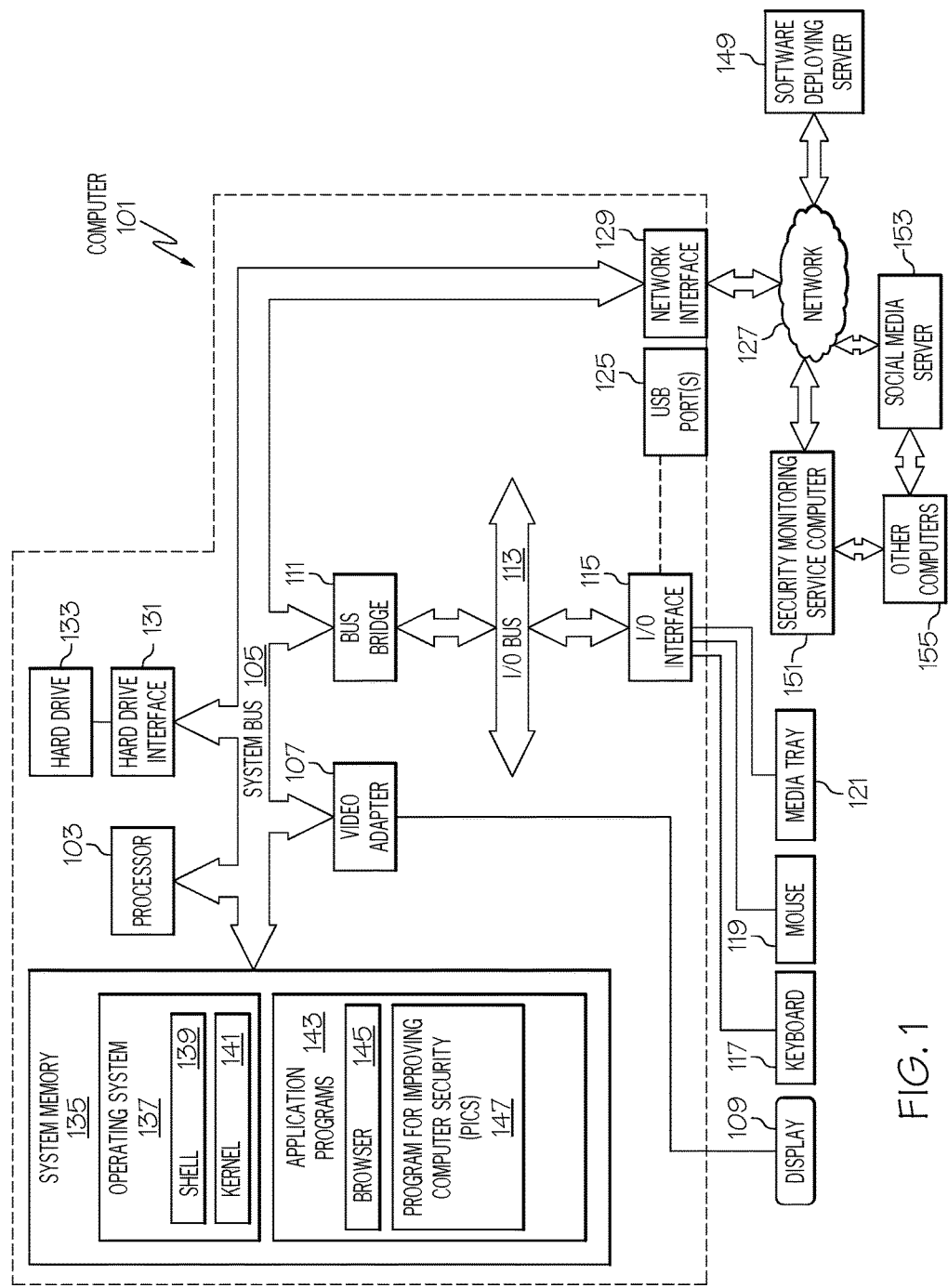
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or security monitoring service computer 151 and/or a social media server 153 and/or other computers 155 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Improving Computer Security (PICS) 147. PICS 147 includes code for implementing the processes described below, including those described in FIGS. 2-4. In one embodiment, computer 101 is able to download PICS 147 from software deploying server 149, including in an on-demand basis, wherein the code in PICS 147 is not downloaded until needed for execution. In one embodiment of the present invention, software deploying server 149 performs all of the functions associated with the present invention (including execution of PICS 147), thus freeing computer 101 from having to use its own internal computing resources to execute PICS 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Computers are subject to many types of security attacks, including dynamic application attacks and static source code attacks.

One exemplary type of dynamic application attack is caused by cross-site scripting (XSS), in which a client computer is redirected to a nefarious server. For example, assume that a computer system (e.g., a client) is using a browser that generates webpages on the client based on hypertext transfer protocol (HTTP) code received from an authentic webpage server. XSS presents a security problem in which an attacker injects code (often javascript—JS code) that causes the client computer to break a connection with the authentic webpage server and to establish a connection between the client computer and an unauthorized server, thus allowing the unauthorized server to steal information from the client computer, send fake webpages to the client computer, etc.

Another type of dynamic application attack is a distributed denial of service (DDoS) attack, in which a computer is flooded with connections/requests, which causes the resources of the computer to be overwhelmed and thus unable to keep up with the new connections/requests.

Static source code attacks directly attack source code running on a computer. For example, a virus may alter source code for software that is running on a computer, thus causing the software (e.g., the operating system, application, etc.) to function improperly. Such source code attacks are called "static" attacks since changes to the source code are usually permanent or semi-permanent, while application attacks are much more dynamic.

A computer may have a large catalogue of routines that can be run to identify and/or correct both dynamic (application) attacks and/or static (source code) attacks. That is, a computer system (including software running on the computer system) may have available to it a large catalogue of security scanning routines that have been developed for that computer system (or that type of computer system). This catalogue may include hundreds or even thousands of scanning routines. A problem with having so many scanning routines is that it is difficult, if not impossible, to utilize them all. That is, if thousands of scanning routines are continuously being executed to look for thousands of security problems on a computer, the computer's resources will be overtaxed to the point of causing the computer to be unable to perform its primary function.

Currently, users of static application source code scanners as well as dynamic application scanners have a hard time orienting and prioritizing scanning routines. The present invention allows such users to add another dimension of data (current time, social, trending activity) to the scanning engine on the computer and/or provides the system with the ability to filter the scanning result (vulnerability list) through the use of third party resources.

Figure 2:
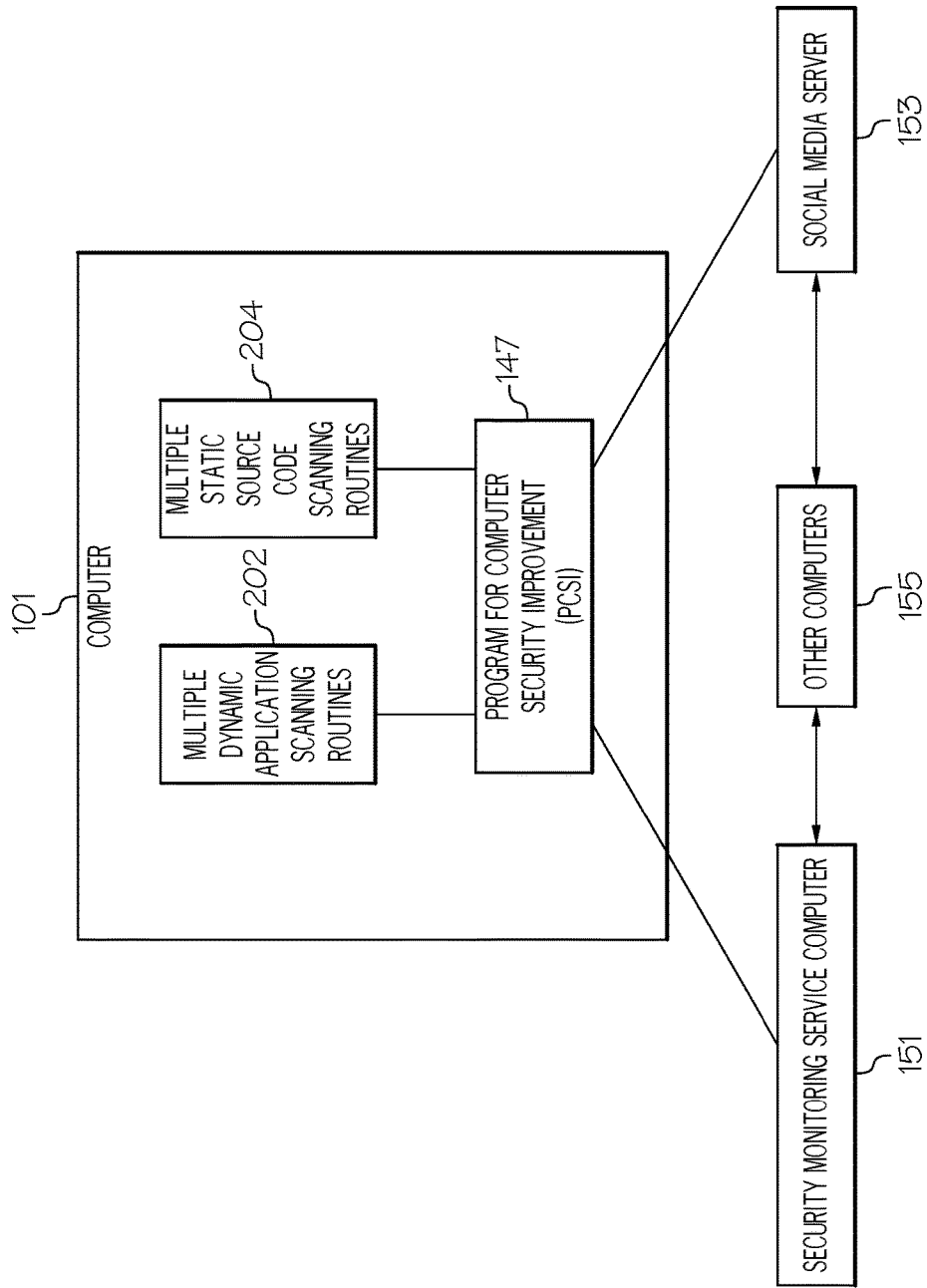
FIG. 2 illustrates an overview of third party resources that control an order in which security protocols are executed in accordance with one or more embodiments of the present invention.

For example and with reference now to FIG. 2, assume that the computer 101 introduced in FIG. 1 has multiple dynamic application scanning routines 202 and multiple static source code scanning routines 204, which may be accessed by or may be part of the PICS 147 introduced in FIG. 1. The multiple dynamic application scanning routines 202 are designed to identify and/or solve issues with the application-based operation of the computer 101 (e.g., XSS attacks, DDOS attacks, etc.), while the multiple static source code scanning routines 204 are designed to identify and/or correct improper changes to source code running on the computer 101.

Without the present invention, the computer 101 does not have an effective way to decide which security routines from multiple dynamic application scanning routines 202 and multiple static source code scanning routines 204 to run and/or in which order. However, information provided by third party resources will allow the PICS 147 to make this decision.

Figure 3:
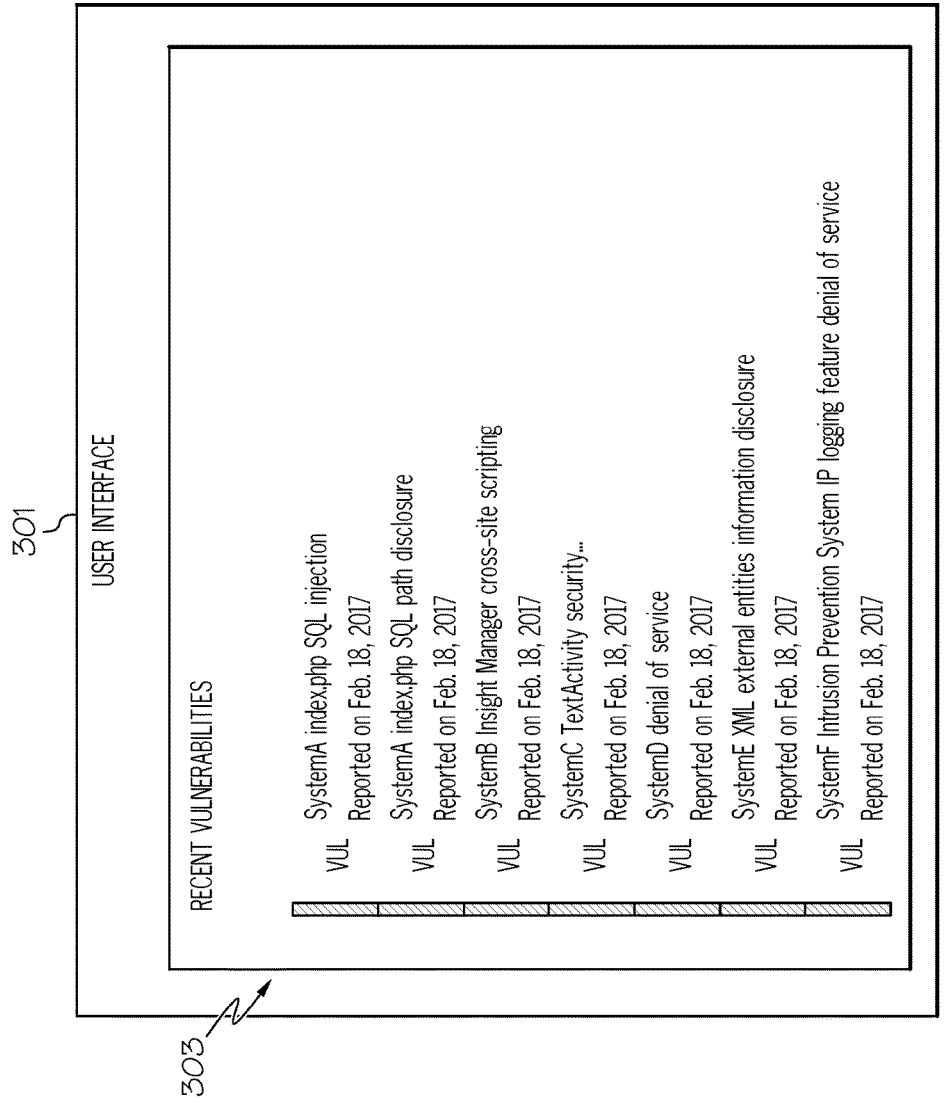
FIG. 3 depicts a user interface displaying multiple computer security issues as identified by a third party resource in accordance with one or more embodiments of the present invention.

For example, assume that the third party resource is a security monitoring service computer 151 used by a security service that monitors multiple other computer systems 155 shown in FIG. 1. That is, the security service monitors computer systems other than the user's computer, in order to report what is "trending" in the world of computer system attacks on other computers than computer 101 in real time. As shown in FIG. 3, this service may provide the client computer (or another monitoring/supervisory computer) with a user interface 301 that identifies what types of attacks are being launched on such other computers (e.g., other computers 155 shown in FIG. 1) and the threat level of these attacks (i.e., how numerous and/or harmful such attacks are). The information shown in user interface 301 is also directly sent to PICS 147 shown in FIG. 1, in order to allow the computer 101 to automatically sort/control the execution of security routines for computer 101. The reported "recent vulnerabilities" shown in FIG. 3 not only identify the types of attacks/vulnerabilities on the other computer systems (e.g., "SystemA index.php SQL injection"), but also their threat levels, as indicated by threat level indicators 303. These threat levels may be based on how the trending recent vulnerabilities may impact computer 101, how severely the identified vulnerabilities affect the overall operation of the other computers 155, what types of operations on the other computers 155 and/or computer 101 are affected by identified vulnerabilities, etc.

Assume now that the user interface 301 shown in FIG. 3 is filtered such that only the types of attacks that are relevant to computer 101 are reported. That is, assume that user interface 301 is displayed on the display 109 on computer 101 and/or received by PICS 147 (see FIG. 1). Assume further that only the types of attacks to which computer 101 is vulnerable are displayed on the user interface 301. Thus, the user and/or PICS 147 are able to prioritize execution of scanning routines based on which types of attacks are currently prevalent (trending) on the other computers 155.

That is, as shown in user interface 301 and indicated by threat level indicators 303, there are currently (in real-time) a large number of attacks caused by SQL injections ("SystemA index.php SQL injection), but only a moderate number of DDoS attacks ("SystemD denial of service"), and even fewer XSS attacks ("SystemB Insight Management cross-site scripting"). As such, the PICS 147 will first run security routines from the multiple dynamic application scanning routines 202 that address SQL injection attacks against computer 101, may or may not then run security routines from the multiple dynamic application scanning routines 202 that address moderate level DDoS attacks against computer 101, and will not run security routines from the multiple dynamic application scanning routines 202 that address the low-level XSS attacks against computer 101.

In an embodiment of the present invention, determining what is "trending" in security attacks on the other computers 155 is based on social media. That is, a social media server 153 will receive limited character (e.g., less than 140 characters) postings, web log (blog) entries, social media webpage postings, etc. These postings are text mined and/or metadata mined to determine the nature of the postings. For example, if there is a large spike for the term "DDoS" in the text and/or metadata for such social media postings, then the PICS 147 will conclude that there has been a real-time spike in DDoS attacks on the other computers 155, and will prioritize the running of security scripts for detecting and/or curing DDoS attacks on computer 101.

Figure 4:
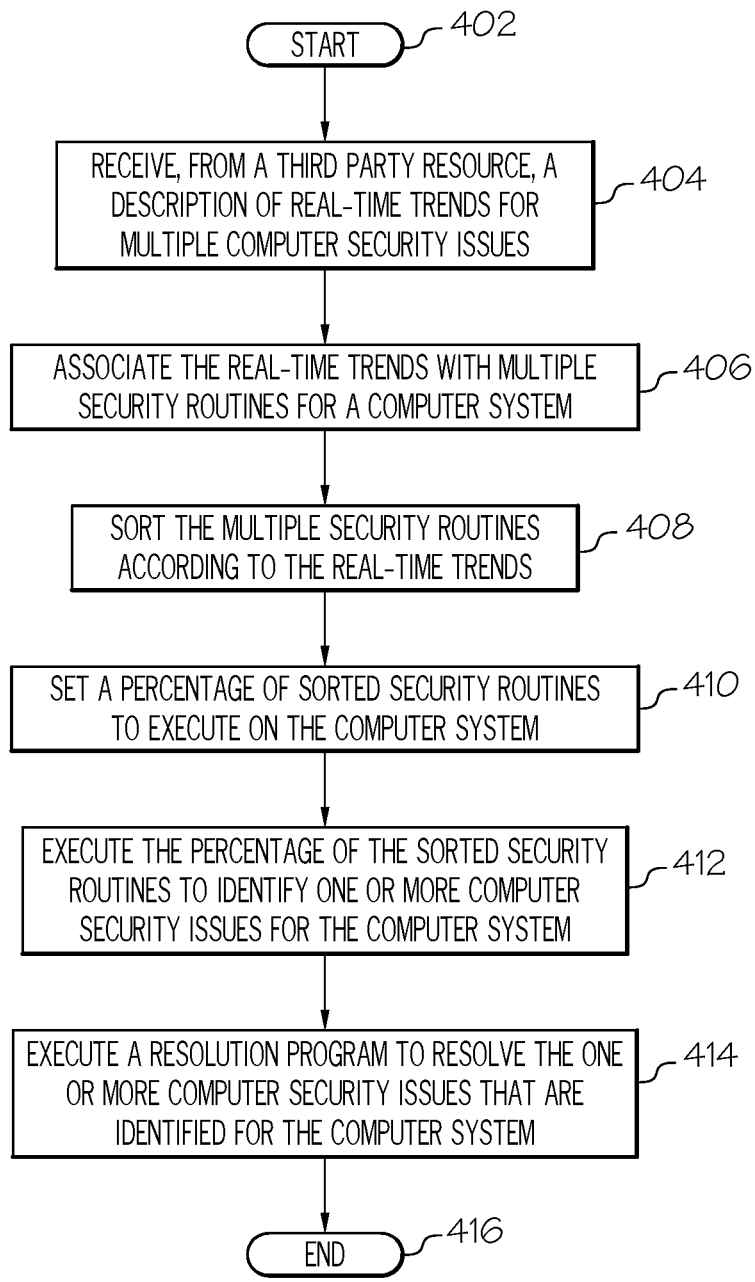
FIG. 4 is a high level flow chart of one or more steps performed by one or more processors and/or other hardware devices to improve a computer system's security in accordance with one or more embodiments of the present invention.

With reference now to FIG. 4, a high level flow chart of one or more steps performed by one or more processors and/or other hardware devices to improve a computer system's security in accordance with one or more embodiments of the present invention is presented.

After initiator block 402, a description of real-time trends for multiple computer security issues is received (i.e., by computer 101) from a third party resource, as described in block 404. As discussed above, this third party resource may be a service that is dedicated to identifying and reporting security issues/attacks that are being experienced by multiple computers (e.g., other computers 155) other than the user's computer 101. In an embodiment, the third party resource may be a social network, in which multiple social media postings are evaluated in order to identify security attack/issue events across multiple other computers.

As described in block 406, the real-time trends are associated with multiple security routines for a computer system. For example, if a real-time trend shows a spike in DDoS attacks in the other computers 155, then this real-time trend is associated with one or more of the multiple security routines that are specific for looking for and/or resolving DDoS attacks in the computer 101.

As described in block 408, the multiple security routines are sorted according to the real-time trends, where the sorting establishes an order of priority for running each of the multiple security routines based on the real-time trends. That is, the logic within the user's computer 101 sets the order for running security routines in the user's computer 101 based on what types of issues/events/attacks are currently trending in the other computers 151.

As described in block 410, a percentage of sorted security routines to execute on the computer system is set. That is, logic within the user's computer determines how many (i.e., what percentage) of the available security routines will be set based on one or more factors.

In an embodiment of the present invention, the factor that determines how many security routines are run is severity. That is, the security routines are sorted according to the severity of the attacks that they are designed to address. For example, assume that the third party resource indicates that there has been a severe uptick in XSS-based attacks. As such, all security routines that are designed for and/or are available to computer 101 for addressing XSS-based attacks on computer 101 will be run.

In an embodiment of the present invention, the factor that determines how many security routines are run is time. That is, computer 101 may set a time limit for how long security routines are run on computer 101. Once that time limit is reached, no more security routines are run on computer 101.

In an embodiment of the present invention, the factor that determines how many security routines are run is usage of particular computer resources within computer 101. That is, computer 101 may rank computer resources within computer 101. For example, if one set of security routines require the use of hard drive 133 shown in FIG. 1, but no other applications currently need hard drive 133, then these security routines are run rather than running security routines that require the use of video adapter 107, which is currently in heavy use by computer 101.

As described in block 412 in FIG. 4, the computer then executes the percentage of the sorted security routines in the order of priority to identify one or more computer security issues for the computer system. That is, that allowable percentage of security routines (which have been sorted according to their priority) are then executed in order to identify computer security issues (e.g., attacks) against computer 101.

As described in block 414, one or more processors (e.g., processor 103) then execute a resolution program (part of PICS 147 shown in FIG. 1) in order to resolve the one or more computer security issues that are identified for the computer system.

The flow chart shown in FIG. 4 ends at terminator block 416.

In an embodiment of the present invention, one or more processors (e.g., processor 103) obtain a scan result from executing the percentage of the sorted security routines in the order of priority, where the scan result identifies system vulnerabilities of the computer system. The one or more processors then filter and rank the system vulnerabilities using the description of real-time trends for multiple computer security issues to further establish the order of priority for running each of the multiple security routines. That is, computer 101 first scans the security routines that are recommended for execution based on what is "trending" with the other computers 155. However, this scan may indicate that certain processes (e.g., mission critical processes) that are protected by the security routines are more important than other processes (e.g., e-mail backup). As such, the security routines (from those suggested by the "trending" from the other computers 155) that are more important are run first.

As described herein, in an embodiment of the present invention the third party resource is a set of postings from a social media service. As such, one or more processors identify metadata that describe the real-time trends for the multiple computer security issues. This metadata may include event data, time data, social data, and trending data. That is, the metadata may describe the attacks to the other computers ("event data"), such as a DDoS, etc.; the metadata may describe when the attacks occurred in the other computers ("time data"); the metadata may describe the social media source of the data ("social data"); and the metadata may described the frequency of the particular types of attacks ("trending data").

In an embodiment of the present invention, the third party resource is from a group consisting of a webpage that is dedicated to reporting security trends, rich site summary (RSS) feeds to multiple computers, subject identifiers for a limited character message posting service, and user names of message posters.

That is, information about attacks on the other computers 155 may come from a service that collects and reports attacks on the other computers ("webpage that is dedicated to reporting security trends").

In an embodiment of the present invention, the multiple other computers may maintain a record of RSS feeds indicative of changes to content to which the other computers subscribe. For example, the RSS feeds may show what changes were made to webpages being browsed by the other computers 155. These RSS feeds may show that some of the changes were improper, and thus indicative of an attack.

In an embodiment of the present invention, the third party resource is based on subject identifiers for a limited character message posting service. That is, certain limited character message posting services (e.g., those that limit social media postings to less than 140 characters) will also use subject identifiers following a special character, such as a hash tag. Thus, a spike in certain subject identifiers (e.g., #DDoS) indicates a spike in chatter about DDoS attacks in the other computers 155.

In an embodiment of the present invention, the third party resource is based on user names of message posters. For example, assume that multiple social media content posters utilize a pseudonym that has "DDoS" in the pseudonym. Such users are assumed to be persons having a special interest in DDoS attacks. Thus, a spike in postings by users that have "DDoS" in their pseudonym ("handle") will indicate a spike in DDoS activity in the other computers 151.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
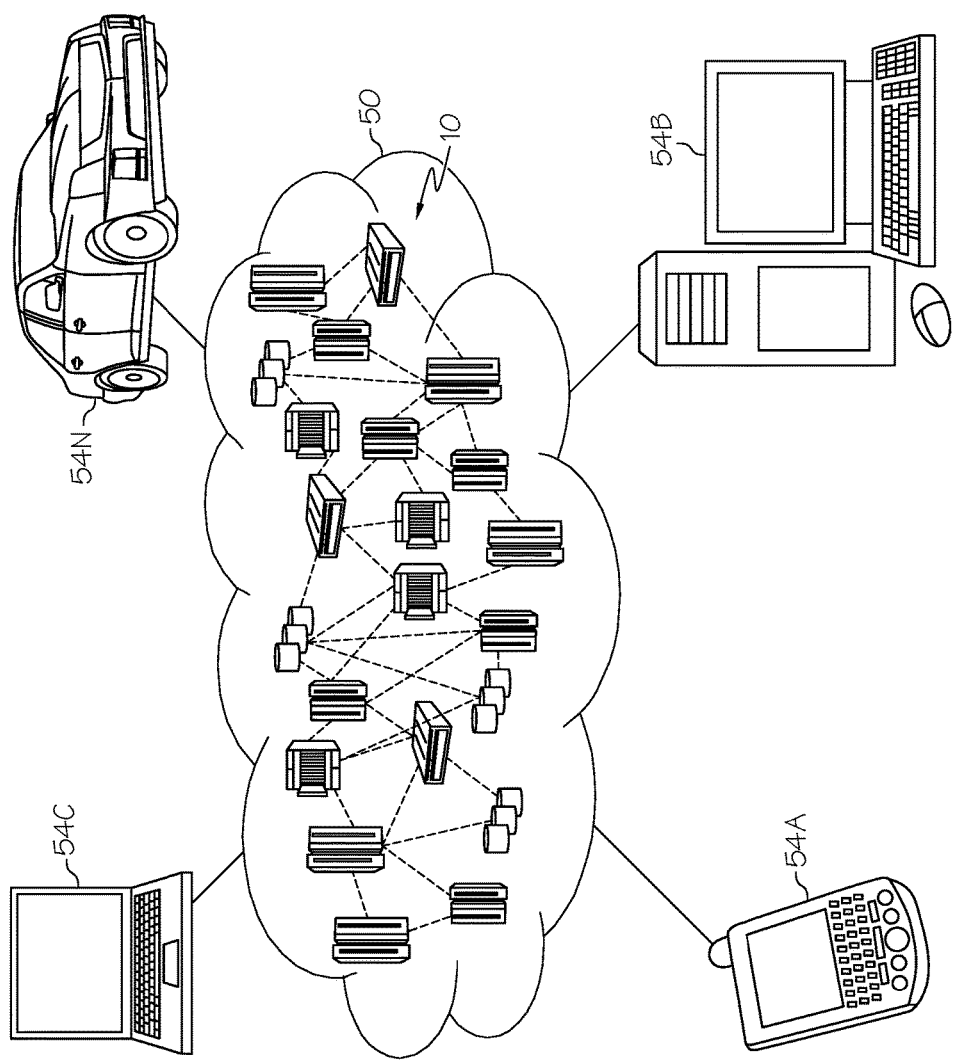
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
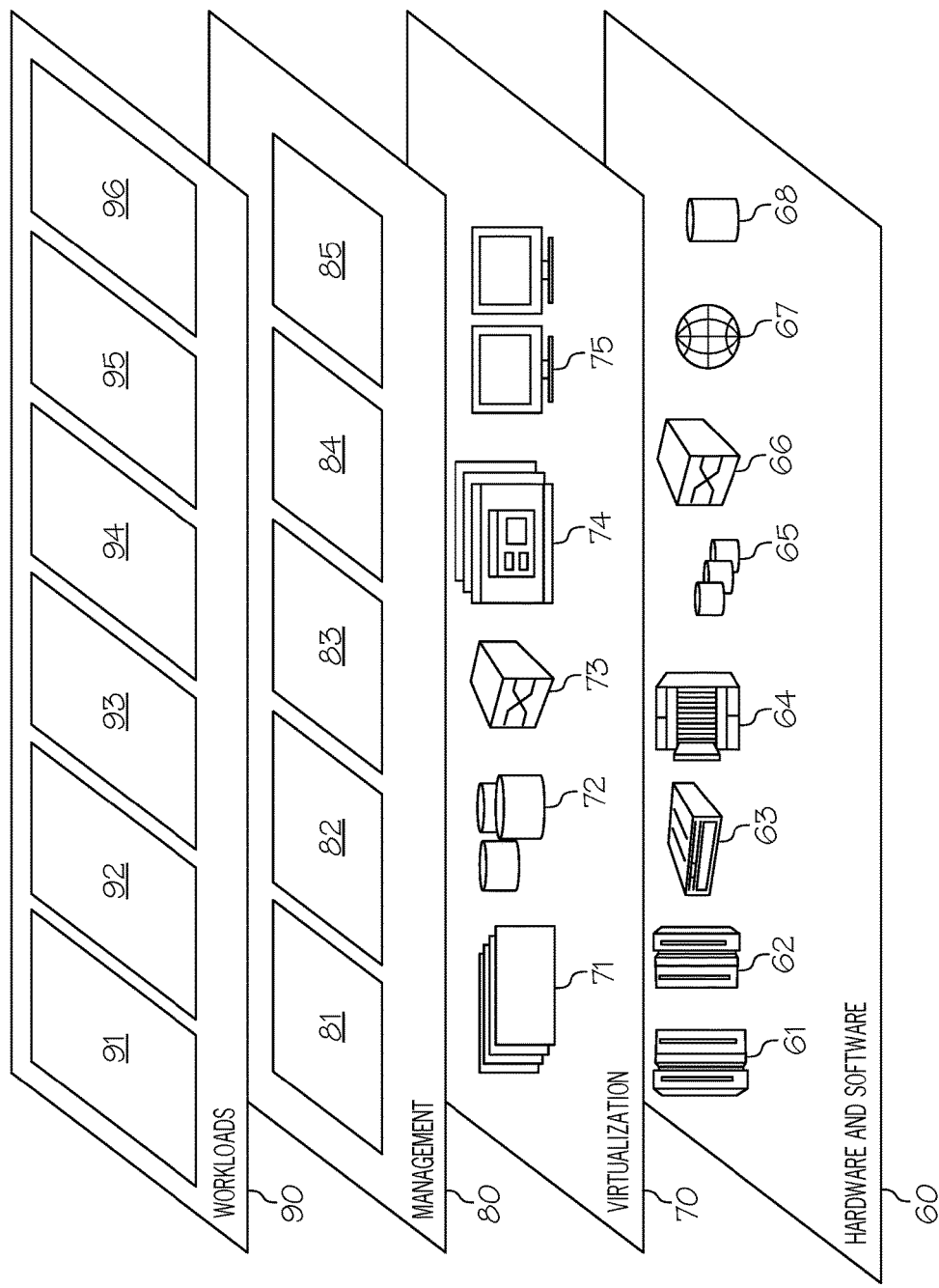
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prioritization of multiple security routines processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of improving a computer system's security, the computer-implemented method comprising:
   receiving, from a third party resource, a description of real-time trends for multiple computer security issues;
   associating the real-time trends with multiple security routines for a computer system;
   sorting the multiple security routines according to the real-time trends, wherein the sorting establishes an order of priority for running each of the multiple security routines based on the real-time trends;
   setting a percentage of sorted security routines to execute on the computer system;
   executing the percentage of the sorted security routines in the order of priority to identify one or more computer security issues for the computer system; and
   executing, by one or more processors, a resolution program for resolving the one or more computer security issues that are identified for the computer system.

2. The computer-implemented method of claim 1, further comprising:
   obtaining, by one or more processors, a scan result from executing the percentage of the sorted security routines in the order of priority, wherein the scan result identifies system vulnerabilities of the computer system; and
   filtering and ranking, by one or more processors, the system vulnerabilities using the description of real-time trends for multiple computer security issues to further establish the order of priority for running each of the multiple security routines.

3. The computer-implemented method of claim 1, wherein the third party resource is a set of postings from a social media service, and wherein the computer-implemented method further comprises:

identifying, by one or more processors, metadata that describe the real-time trends for the multiple computer security issues.

4. The computer-implemented method of claim 3, wherein the metadata include event data, time data, social data, and trending data.

5. The computer-implemented method of claim 1, wherein the third party resource is from a group consisting of a webpage that is dedicated to reporting security trends, rich site summary (RSS) feeds to multiple computers, subject identifiers for a limited character message posting service, and user names of message posters.

6. The computer-implemented method of claim 1, wherein the third party resource is a security monitoring service that generates the description of the real-time trends for the multiple computer security issues.

7. The computer-implemented method of claim 1, wherein the description of the real-time trends for the multiple computer security issues is limited to real-time trends that are associated with the multiple security routines for the computer system.

8. A computer program product for improving a computer system's security, the computer program product comprising a non-transitory computer readable storage device having program instructions embodied therewith, the program instructions readable and executable by a computer to perform a method comprising:

receiving, from a third party resource, a description of real-time trends for multiple computer security issues;

associating the real-time trends with multiple security routines for a computer system;

sorting the multiple security routines according to the real-time trends, wherein the sorting establishes an order of priority for running each of the multiple security routines based on the real-time trends;

setting a percentage of sorted security routines to execute on the computer system;

executing the percentage of the sorted security routines to identify one or more computer security issues for the computer system; and executing a resolution program for resolving the one or more computer security issues that are identified for the computer system.

9. The computer program product of claim 8, wherein the method further comprises:

obtaining a scan result from executing the percentage of the sorted security routines in the order of priority, wherein the scan result identifies system vulnerabilities of the computer system; and filtering and ranking the system vulnerabilities using the description of real-time trends for multiple computer security issues to further establish the order of priority for running each of the multiple security routines.

10. The computer program product of claim 8, wherein the third party resource is a set of postings from a social media service, and wherein the method further comprises:

identifying metadata that describes the real-time trends for the multiple computer security issues.

11. The computer program product of claim 10, wherein the metadata includes event data, time data, social data, and trending data.

12. The computer program product of claim 8, wherein the third party resource is from a group consisting of a webpage that is dedicated to reporting security trends, rich site summary (RSS) feeds to multiple computers, subject identifiers for a limited character message posting service, and user names of message posters.

13. The computer program product of claim 8, wherein the third party resource is a security monitoring service that generates the description of the real-time trends for the multiple computer security issues.

14. The computer program product of claim 8, wherein the description of the real-time trends for the multiple computer security issues is limited to real-time trends that are associated with the multiple security routines for the computer system.

15. The computer program product of claim 8, wherein the program instructions are provided as a service in a cloud environment.

16. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to receive, from a third party resource, a description of real-time trends for multiple computer security issues;

program instructions to associate the real-time trends with multiple security routines for a computer system;

program instructions to sort the multiple security routines according to the real-time trends, wherein the sorting establishes an order of priority for running each of the multiple security routines based on the real-time trends;

program instructions to set a percentage of sorted security routines to execute on the computer system;

program instructions to execute the percentage of the sorted security routines to identify one or more computer security issues for the computer system; and program instructions to execute a resolution program for resolving the one or more computer security issues that are identified for the computer system.

17. The computer system of claim 16, further comprising:

program instructions to obtain a scan result from executing the percentage of the sorted security routines in the order of priority, wherein the scan result identifies system vulnerabilities of the computer system; and program instructions to filter and rank the system vulnerabilities using the description of real-time trends for multiple computer security issues to further establish the order of priority for running each of the multiple security routines.

18. The computer system of claim 16, wherein the third party resource is a set of postings from a social media service, and wherein the computer system further comprises:

program instructions to identify metadata that describes the real-time trends for the multiple computer security issues, wherein the metadata includes event data, time data, social data, and trending data.

19. The computer system of claim 16, wherein the third party resource is from a group consisting of a webpage that is dedicated to reporting security trends, rich site summary (RSS) feeds to multiple computers, subject identifiers for a limited character message posting service, and user names of message posters.

20. The computer system of claim 16, wherein the description of the real-time trends for the multiple computer security issues is limited to real-time trends that are associated with the multiple security routines for the computer system.

\* \* \* \* \*